HENRY GEISENHÖNER, OF SCHENECTADY, NEW YORK, ASSIGNOR TO GENERAL ELECTRIC COMPANY, A CORPORATION OF NEW YORK.

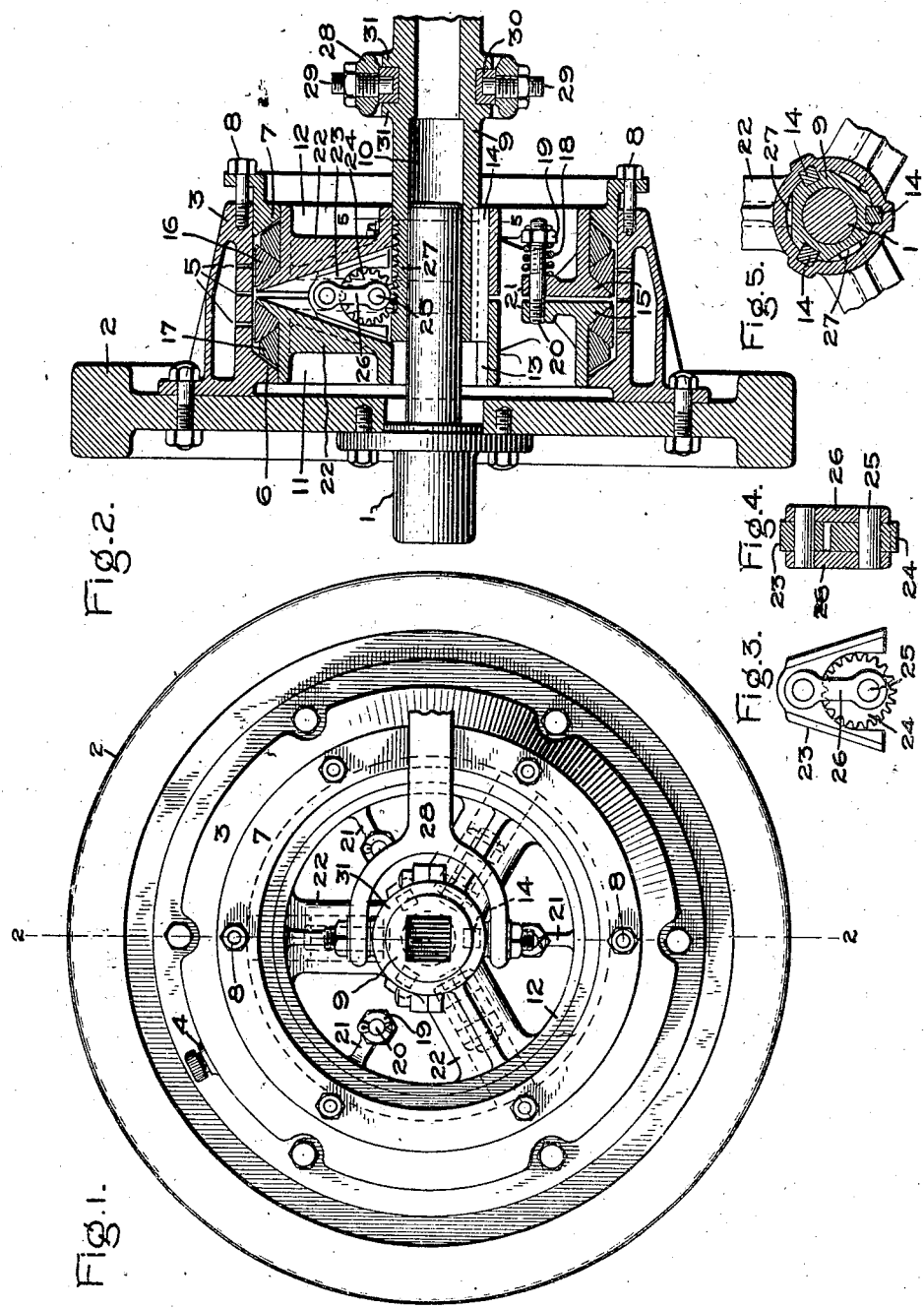
H. GEISENHÖNER.
FRICTION CLUTCH.
APPLICATION FILED JULY 10, 1908.
946,123.
Patented Jan. 11, 1910.
Witnesses:
Marcus L. Byng.
J. Ellis Glenn
Inventor:
Henry Geisenhöner,
by
Att'y

UNITED STATES PATENT OFFICE.

FRICTION-CLUTCH.

946,123.

Specification of Letters Patent.   Patented Jan. 11, 1910.

Application filed July 10, 1908.   Serial No. 442,825.

*To all whom it may concern:*

Be it known that I, HENRY GEISENHÖNER, a citizen of the United States, residing at Schenectady, county of Schenectady, State of New York, have invented certain new and useful Improvements in Friction-Clutches, of which the following is a specification.

This invention relates to mechanism for coupling and uncoupling two rotatable shafts, its object being to produce an efficient, strong and easily operated friction clutch.

The invention consists in the combination of a driving member with a driven member, one carrying a fixed friction element and the other an expansible friction element, wedges for expanding said element, gears connected to said wedges by wrist pins and pitmen, and racks for operating said gears.

In the accompanying drawing, Figure 1 is an end elevation of a clutch embodying my invention; Fig. 2 is a diametrical section of the same on the line 2—2, Fig. 1; Fig. 3 is a view of one of the wedges with its gear and pitman; Fig. 4 is a section of the same; and Fig. 5 is a cross section on the line 5—5, Fig. 2.

It is immaterial which of the two rotatable members does the driving, but for the sake of convenience, let it be the shaft 1, carrying the fly-wheel 2 having a cylindrical bearing surface, preferably a concentric cylindrical flange 3 secured to one side of said wheel, and preferably hollow to form a chamber for lubricant. A filling spout 4 is provided, and the inner wall of the chamber has a number of fine holes 5 to feed the lubricant to the annular brake-shoes hereinafter described. At the base of the flanges, next the fly-wheel, is a beveled shoulder 6, while a beveled ring 7 is secured by screws 8 to the outer end of the flange, said ring lying inside the flange with its beveled surface facing the shoulder 6. The other rotatable member is a shaft 9 having a tubular portion 10 adapted to slide longitudinally on the shaft 1, and through the hub of a wheel made in two sections 11, 12, placed side by side on the portion 10, and having keyways 13 which engage with keys 14 in said portion of the shaft. The rim of the section 11 has a sliding fit inside the shoulder 6 on the flange, while the rim of the section 12 has a similar fit inside the ring 7. At the adjacent edges of said wheel-sections, each wheel has a beveled flange 15.

In the spaces between the wheel sections and the flange 3 are located annular brake-shoes, consisting of split or segmental rings. Those numbered 16 are V-shaped in cross-section, and lie against the flanges 15. The other shoes 17 lie adjacent to the shoulder 6 and the ring 7, and their cross-section is that of an inverted V, so that they also fit against the shoes 16. It will be seen that if lateral pressure is brought to bear upon them, by moving the wheel sections apart and squeezing the shoes between the flanges 15 and the shoulder 6 and ring 7, the brake-shoes 16 will be expanded out against the flange 3, and the shoes 17 will be contracted upon the rims of the wheel sections, while at the same time the shoes will be forced tightly together. The effect will be to produce a frictional interlock between the wheel sections and the fly-wheel, so that the rotatory movement of the latter will be imparted to the former, and through them to the shaft 9. The two wheel sections are urged against the wheel section 12 and at the end against the wheel section 12 and at the other end against a nut 19 on a stud 20 fixed in the wheel 11 and projecting through a hole in the wheel 12. The stud and spring are preferably mounted in short arms 21 extending radially inward from the rims of the two wheel sections.

Suitable means are provided for forcing apart said wheel sections, preferably by providing oppositely-disposed inclined radial grooves in the spokes 22 of the wheel sections, said grooves converging toward the rims of the sections, and placing in said grooves wedges 23, with mechanism for forcing said wedges radially outward to separate said wheel sections. The preferred mechanism consists of gear-wheels 24, each located in a recess in the base of a wedge, and carrying on each side a wrist-pin 25 which is connected with the outer end of the wedge by a pitman 26. The gear wheels mesh with racks 27 cut in the outer surface of the tubular portion 10 of the shaft 9 between the keys 14. The shaft 9 can be slid to and fro by a forked lever 28 carrying pins 29 which pivot in a ring 30 held rotatably between two collars 31 on said shaft.

The operation is as follows. By means of the lever 28 the shaft 9 is moved toward the flywheel 2, thereby causing the racks 27 to rotate the gears 24, whose pitmen 26 push the wedges 23 radially outward in their grooves in the spokes of the wheel sections 11 and 12, thereby forcing said sections apart against the tension of the springs 18. This movement of the wheel sections crowds the annular beveled segmental brake-shoes 16, 17 together causing them to hug the rims of the wheel sections and grip the flange 3 on the flywheel 2, and thus couple together the shafts 1 and 9. The parts are so proportioned that in going to the closed position of the clutch, the gears make substantially a half revolution and carry the wrist-pins 25 up to the outer dead center; thus effectually locking the clutch and relieving the lever 28 from all strains.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A friction clutch for two rotatable members, comprising a cylindrical bearing surface on one member, wheel sections side by side on the other member, brake-shoes between said bearing surface and sections, and means for forcing apart said sections in an axial direction to set the shoes.

2. A friction clutch for two rotatable members, comprising a cylindrical bearing surface on one member, wheel sections side by side on the other member, brake-shoes having beveled edges supported on said sections adjacent to said bearing surface, and means for separating said sections axially to crowd said shoes together and against said sections and bearing surface.

3. A friction clutch for two rotatable members, comprising a cylindrical bearing surface on one member having a beveled shoulder, a beveled ring opposite to said shoulder two wheel sections on the other member lying side by side within said bearing surface, segmental annular brake shoes on the rims of said sections having beveled edges coöperating with said shoulder and ring, and means for forcing apart said sections axially to crowd said shoes together.

4. A friction clutch for two rotatable members, comprising an annular bearing surface on one member, two wheel sections side by side on the other member, annular brake shoes between said sections and surface, and wedges acting radially between said sections to separate them.

5. A friction clutch for two rotatable members, comprising an annular bearing surface on one member, two wheel sections side by side on the other member, annular brake shoes between said sections and surface, wedges acting radially between said sections to separate them, a gear wheel and pitman for actuating each wedge, and means for rotating said gears.

6. A friction clutch for two rotatable members, comprising an annular bearing surface on one member, two wheel sections side by side on the other member, annular brake shoes between said sections and surface, wedges between said sections having recesses in their bases, gear wheels in said recesses, pitmen connecting said gears and wedges, and racks for actuating said gears.

7. The combination with a shaft carrying a fly wheel having a concentric flange, of a co-axial shaft movable longitudinally and provided with racks, a pair of wheel sections splined on said movable shaft, wedges for forcing apart said sections, gear wheels meshing with said racks, pitmen connecting said wheels and wedges, and annular brake-shoes between the wheel sections and said flange, adapted to be rendered operative by the sliding of the movable shaft.

8. A friction clutch for two rotatable members, comprising a cylindrical bearing surface on one member, two wheel sections mounted side by side on the other member and arranged within said bearing surface, each section being provided with a cylindrical bearing surface parallel to the first mentioned surface, expansible shoes between the bearing surfaces on said member and said sections, and means for moving the sections relative to each other in an axial direction to effect the expansion of said shoes against the bearing surface on said member.

9. A friction clutch for two rotatable members, comprising a cylindrical bearing surface on one member having a beveled shoulder at each edge thereof, two wheel sections mounted side by side on the other member and arranged within said bearing surface, each section being provided with a cylindrical portion having a bearing surface parallel to the first mentioned surface, expansible shoes mounted on the cylindrical portions of said sections and having beveled lateral surfaces that engage said shoulders, and means for moving the sections relative to each other in an axial direction to bring the beveled surface of the shoes and shoulders into engagement to thereby effect the expansion of said shoes against the bearing surface on said member.

In witness whereof, I have hereunto set my hand this 9th day of July, 1908.

HENRY GEISENHÖNER.

Witnesses:
 HELEN ORFORD,
 FRANK J. DORE.